United States Patent
Joyce et al.

(10) Patent No.: US 8,910,144 B1
(45) Date of Patent: Dec. 9, 2014

(54) MANAGING SOFTWARE ENVIRONMENT INSTALLATION

(75) Inventors: Scott E. Joyce, Foxborough, MA (US);
Bruce R. Rabe, Dedham, MA (US);
Mark A. Parenti, Milford, NH (US);
Timothy Cox, Mendon, MA (US); Eric S. Lewine, Apex, NC (US); Ralph J. Marshall, Hillsborough, NC (US)

(73) Assignee: EMC Corporation, Hopkinton, MA (US)

( * ) Notice: Subject to any disclaimer, the term of this patent is extended or adjusted under 35 U.S.C. 154(b) by 590 days.

(21) Appl. No.: 12/894,282

(22) Filed: Sep. 30, 2010

(51) Int. Cl.
*G06F 9/445* (2006.01)

(52) U.S. Cl.
USPC ............ 717/174; 717/176; 717/177; 717/178

(58) Field of Classification Search
None
See application file for complete search history.

(56) References Cited

U.S. PATENT DOCUMENTS 7,844,492 B2 * 11/2010 Perkowski et al. .......... 705/14.4
2007/0255798 A1 * 11/2007 Schneider .................... 709/217

* cited by examiner

*Primary Examiner* — Qamrun Nahar
(74) *Attorney, Agent, or Firm* — Krishnendu Gupta; Jason A. Reyes

(57) ABSTRACT

A method for use in managing software environment installation is disclosed. A set of storage systems is identified to be managed via a Flex based data storage management application. It is determined whether the Flex based data storage management application can communicate with every data storage system in the set of data storage systems. Based on the determination, it is determined whether to cause installation of a Java operating environment allowing the Flex based data storage management application to communicate with every data storage system in the set of data storage systems.

16 Claims, 4 Drawing Sheets

MANAGING SOFTWARE ENVIRONMENT INSTALLATION

BACKGROUND

1. Field of the Invention

The present invention relates to managing software environment installation.

2. Description of Prior Art

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen or other display, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

A typical computer network being used today that can run object oriented software is a client-server network, the client being the user (GUI) or workstation and the server being software (discrete or distributed throughout the network) which serves the client. In this network, a computer system can employ one or more object-oriented computer languages such as C++, XML (eXtensible Markup Language), Java, Flash, and/or others. Briefly, an object, in computer software terms, is a dedicated area of memory which can be thought of as an impervious container holding both data and instructions within itself, both defining itself and its relationships to other objects in the computer system or network. Such object or node can send and receive messages to and from other objects, respond and react to such messages (e.g. commands) but shall normally be impervious to internal scrutiny. For example, in a computer data storage system (a kind of computer) each object (system object) may describe or relate to a specific tangible detail in the storage system or in the storage system's processor (e.g., details such as those describing or relating to aspects of operation of the processor's cooling-fan, power switch, cache memory, power supply, disk drive interface, individual disks, etc.).

With respect to networks, people today use the World Wide Web for a variety of different and diverse tasks for example locating information, ordering and buying goods on-line and managing their finances. Many users expect that these applications will operate regardless of what type of computer platform is used.

Java technology, which is a trademark of Sun Microsystems, Inc, helps provide a solution by allowing the creation of computer platform independent programs. The Java technology includes an object oriented programming language and a platform on which to run the Java applications (known as Java Runtime Environment or JRE). Java is both a compiled and an interpreted language. The source code that has been written by the application developer is compiled into an intermediate form called a Java bytecode, which is a platform independent language. At a client machine, the java bytecodes are interpreted by the Java platform and the Java interpreter parses and runs each Java bytecode instruction on the computer. (If the Java bytecode is run as a applet, it may first be sent over the network to the client machine.)

Java's objected oriented programming language is based on using objects and classes and this paragraph will introduce the reader to a few basic concepts. Just like real world objects, software objects consist of a state and a behavior. A software object maintains its state in one or more variables and a variable is an item of data named by an identifier. A software object implements its behavior with methods and a method is a function associated with an object. Just like any other objected oriented programming language objects communicate with each other by passing messages. Further object oriented concepts are well known in the art and will not be described here further.

The Java platform includes the Application Programming Interface (API), which is a large collection of ready-made software components, which provide a variety of capabilities, and the Java Virtual Machine (JVM) which will be explained in the paragraph below. Together the JVM and the API sit on top of the hardware based computer platform and provide a layer of abstraction between the Java program and the underlying hardware.

The JVM is made up of software, which can run a Java program on a specific computer platform of a client machine. Before a Java program can be run on a JVM, the Java program must first be translated into a format that the JVM recognizes, which is called a Java class file format. The Java class file format contains all the information needed by a Java runtime system to define a single Java class.

Adobe Flex is a collection of technologies released by Adobe Systems for the development and deployment of cross platform rich Internet applications based on the Adobe Flash platform. Flex provides a workflow and programming model that is familiar to developers. Macromedia XML ("MXML"), an eXtensible Markup Language ("XML")-based markup language, offers a way to build and lay out graphic user interfaces. Interactivity is achieved through the use of ActionScript, the core language of Flash Player that is based on the European Computer Manufacturers Association ("ECMA") ECMAScript standard. A Flex software development kit ("SDK") comes with a set of user interface components including buttons, list boxes, trees, data grids, several text controls, charts, graphs and various layout containers. Other features such as web services, drag and drop, modal dialogs, animation effects, application states, form validation, and other interactions round out the application framework.

A Flex application may be a rich internet application ("RIA"). RIAs introduce an intermediate layer of code, often called a client engine, between the user and the server. This client engine is typically downloaded as part of the instantiation of the application, and may be supplemented by further code downloads as use of the application progresses. The client engine acts as an extension of the browser, and usually takes over responsibility for rendering the application's user interface and for server communication. What can be done in a RIA may be limited by the capabilities of the system used on the client, but in general, the client engine is programmed to perform application functions that its designer believes will enhance some aspect of the user interface, or improve its responsiveness when handling certain user interactions, compared to a standard Web browser implementation. Also, while simply adding a client engine does not force an application to depart from the normal synchronous pattern of interactions between browser and server, in most RIAs the client engine performs additional asynchronous communications with servers.

In a multi-tiered model, Flex applications serve as the presentation tier. Unlike page-based Hypertext Markup Language ("HTML") applications, Flex applications provide a stateful client where significant changes to the view don't require loading a new page. Similarly, Flex and Flash Player provide many useful ways to send and load data to and from server-side components without requiring the client to reload the view. To incorporate a Flex application into a website, one typically embeds Shockwave Flash (.SWF) file in an HTML, JavaServer Pages ("JSP"), Adobe, ColdFusion, or other type of web page. The page that embeds the SWF file is known as the wrapper. A wrapper consists of an <object> tag and an <embed> tag that format the SWF file on the page, define data object locations, and pass run-time variables to the SWF file. In addition, the wrapper can include support for history management and Flash Player version detection and deployment.

SUMMARY OF THE INVENTION

A method for use in managing software environment installation is disclosed. A set of storage systems is identified to be managed via a Flex based data storage management application. It is determined whether the Flex based data storage management application can communicate with every data storage system in the set of data storage systems. Based on the determination, it is determined whether to cause installation of a Java operating environment allowing the Flex based data storage management application to communicate with every data storage system in the set of data storage systems.

BRIEF DESCRIPTION OF THE DRAWINGS

Features and advantages of the present invention will become more apparent from the following detailed description of exemplary embodiments thereof taken in conjunction with the accompanying drawings in which.

DESCRIPTION OF EMBODIMENT(S)

Described below is a technique for use in managing software environment installation. In at least one implementation, the technique may be used to help provide for Flex/Java client configuration and detection. In at least one implementation using the technique, it is determined whether both Flex and JRE are required on a client system; if so, it is detected whether a correct Flash player and JRE are installed on the client system at the same time and if necessary the user is prompted to update accordingly; if not, a warning message that the JRE is not installed is delayed until the user performs an operation that requires the JRE. (In some situations when a web based application is running, the end user may not have a JRE installed and Flex aspects of the application do not require Java-based content.) In response to the warning message, the user has the option to install/update the JRE or cancel the operation.

Figure 1:
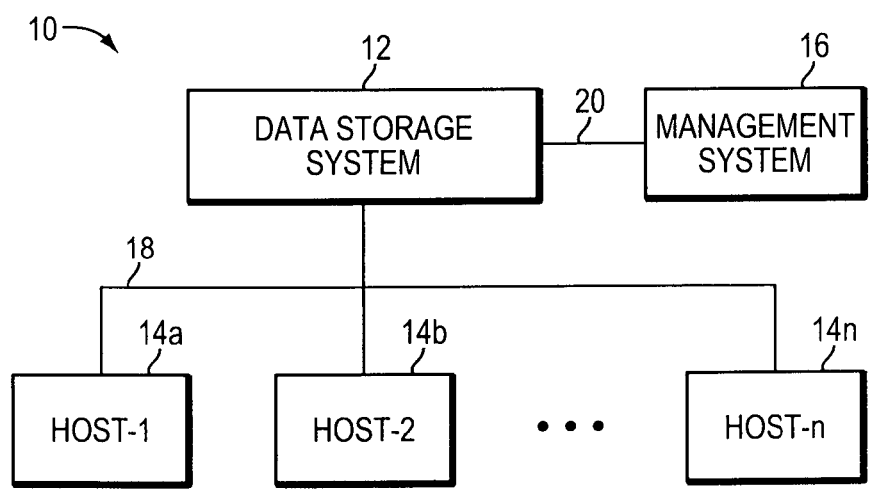
FIGS. 1, 3 are illustrations of systems that may be used with the technique herein.

Referring now to FIG. 1, shown is an example of an embodiment of a computer system that may be used in connection with performing the technique described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a 14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a 14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also be included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

Figure 2:
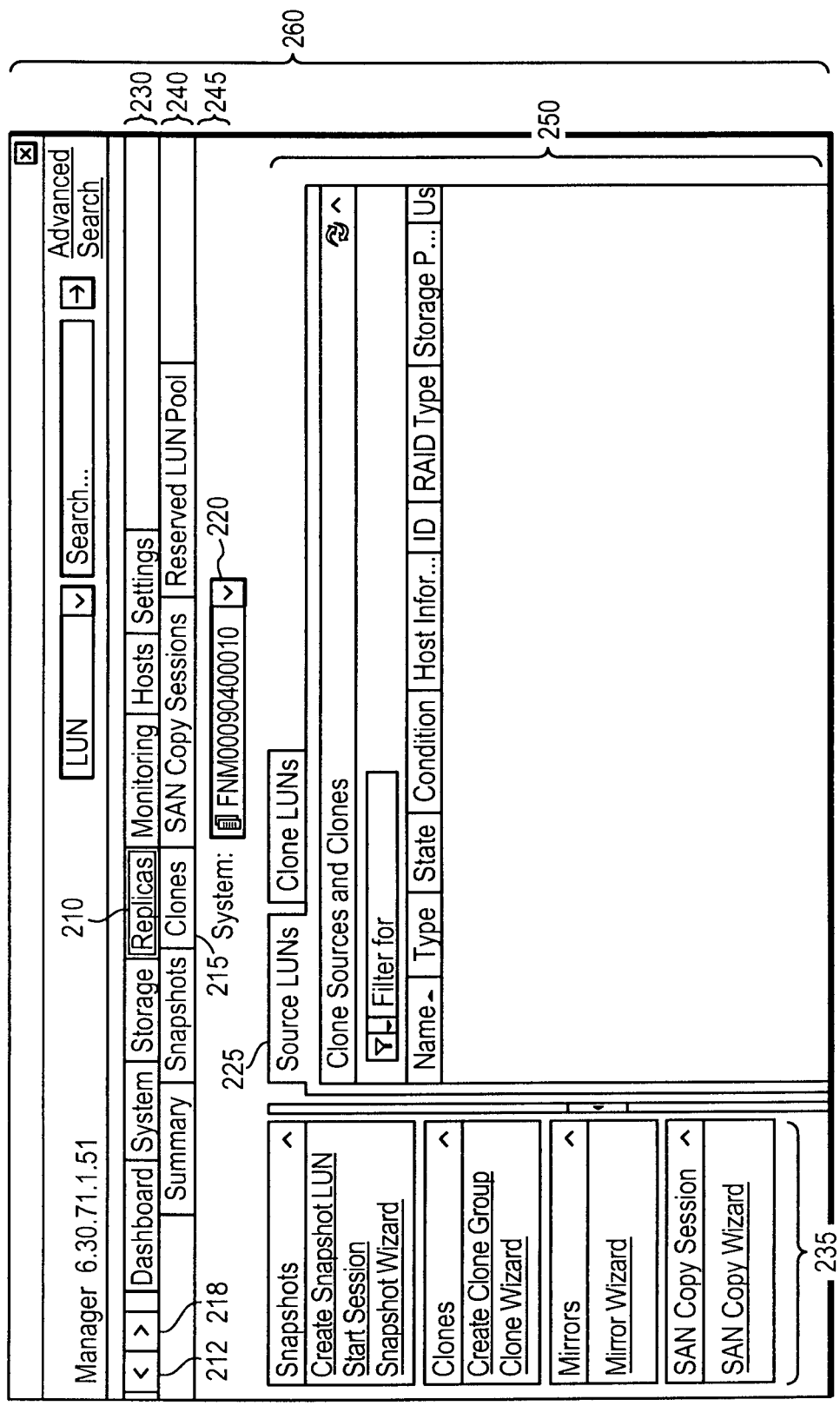
FIG. 2 is an illustration of user interface screens and content that may be used with the technique herein.

Referring now to FIG. 2, shown is an example of a GUI 260 that may be used in connection with the technique described herein and that may be included in the management system 16. As shown, GUI 260 has a section panel 230 that has buttons including REPLICAS button 210 and a backward navigation button 212 and a forward navigation button 218. GUI 260 also has a subsection panel 240 that has buttons including CLONES button 215. A system selection area 245 of GUI 260 has a system selection pulldown menu 220. GUI 260 also has a links table 235 and main body area 250 that has tabs including tab 225.

Figure 3:
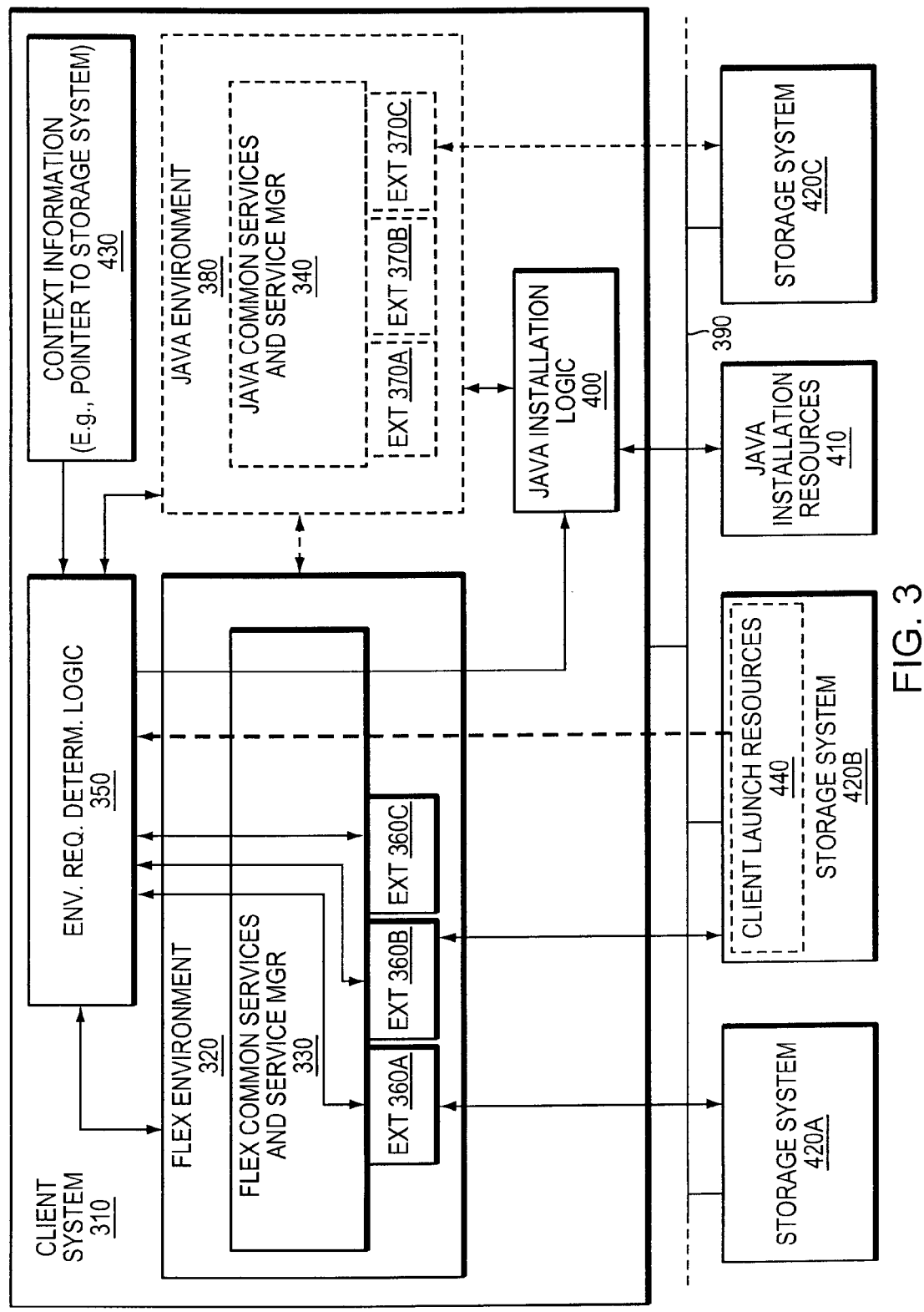
Figure 4:
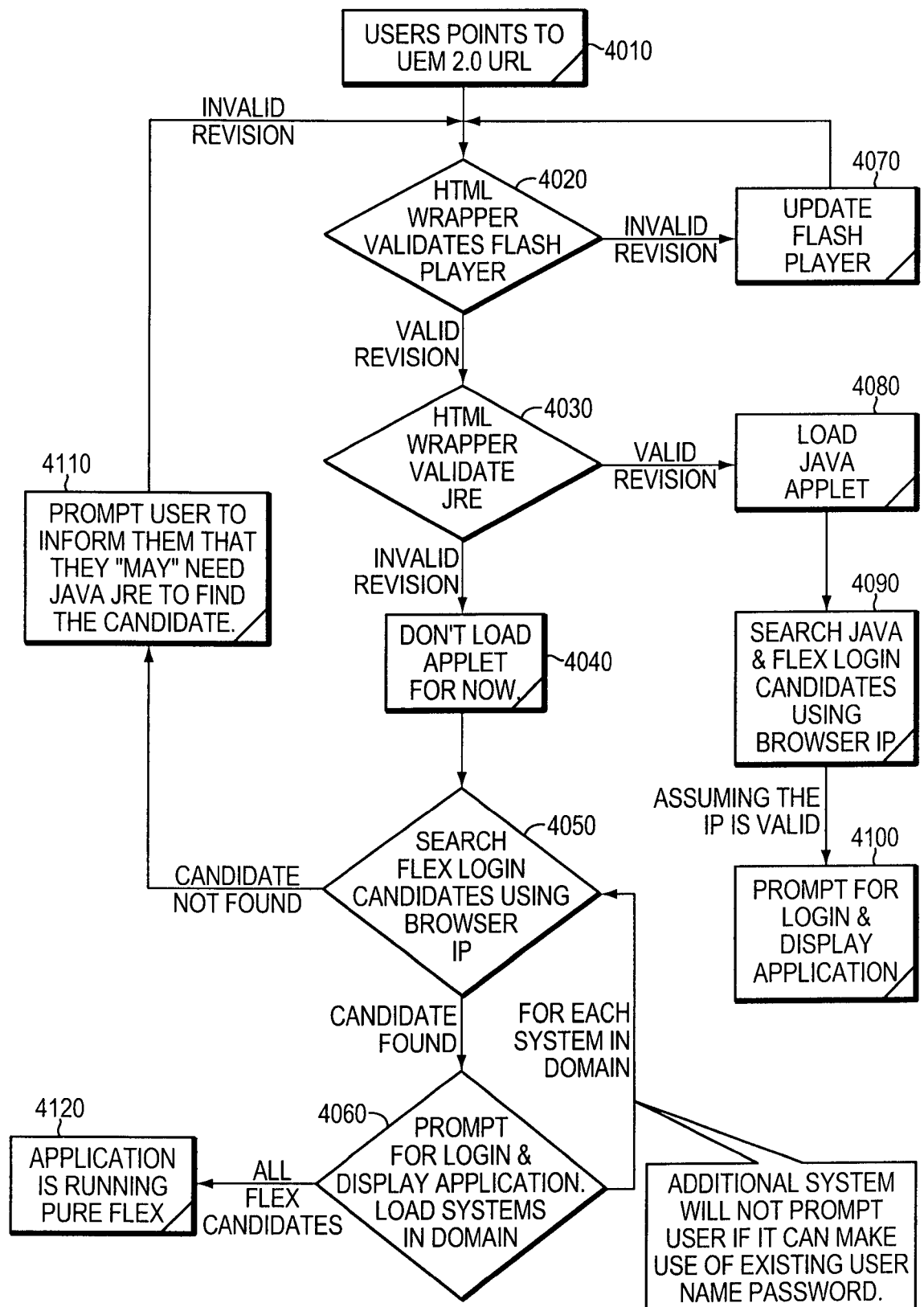
FIG. 4 is an illustration of a flow diagram of a process that may be used with the technique herein.

FIGS. 3-4 illustrates details of an implementation example that uses the technique, and that may be used in producing and/or controlling GUI 260. Client system 310 (e.g., a computer running a Web browser) may be, include, or be included in management system 16, and may be used in producing GUI 260, one or more of storage systems 420A, 420B, 420C may be, include, or be included in data storage systems 12, and network 390 may be, include, or be included in communication medium 20.

System 310 has environment requirements determination logic 350 that operates, as described below, to determine whether system 310 has one or more specified operating environments already installed, and if not, to cause one or more of such environments to be installed as necessary. Each operating environment serves as a platform on which applications may be executed.

In particular, logic 350 determines whether Java operating environment 380 needs to be installed and avoids causing installation of environment 380 unless and until needed. Java operating environment 380 includes the JRE.

In operation, system 310 relies on at least Flex operating environment 320 on which a Flex common services and service manager 330 executes, and, as described below, may also rely on Java operating environment 380 on which a Java common services and service manager 340 may execute. Managers 330, 340 are applications that are not included in environments 320, 380 respectively but that execute on environments 320, 380 respectively.

On startup, manager 330 loads Flex based extensions such as extensions 360A, 360B, 360C for use in communicating with, e.g., storage systems 420A, 420B. For example, if the user uses system selection pulldown menu 220 to select system 420A, manager 330 may rely on extension 360A to communicate with system 420A to retrieve status and/or configuration information about system 420A to help fill out main body area 250 for system 420A.

Similarly, if necessary, on startup, manager 340 loads Java based extensions such as extensions 370A, 370B, 370C for use in communicating with, e.g., storage system 420C. For example, if the user uses system selection pulldown menu 220 to select system 420C, manager 340 may rely on extension 370C to communicate with system 420C to retrieve status and/or configuration information about system 420C to help fill out main body area 250 for system 420C.

The Flex based and Java based extensions are also applications that are not included in environments 320, 380 respectively but that execute on the respective environments 320, 380.

Manager 330 may not have an extension that can communicate directly with system 420C. In such a case, system 310 must rely on manager 340 and a Java based extension to communicate with system 420C (which is therefore a "Java-access system"). In at least some implementations, Flex environment 320 controls all or nearly all of GUI 260, and any communication that manager 330 requires with Java-access systems must be routed through manager 340, so that, for example, manager 340 retrieves information from system 420C and provides such information to manager 330 so that manager 330 can help fill out main body area 250 for system 420C.

If there are no Java-access systems, environment 380 is not necessary, and it is therefore advantageous to avoid causing installation of environment 380. Thus, as described below, on startup of system 310, logic 350 determines whether there are any Java-access systems that system 310 needs to access, and if not, logic 350 avoids causing installation of environment 380.

With reference now to FIG. 4, the user starts system 310 by directing a Web browser to load from a URL ("UEM 2.0 URL") for system 310 (step 4010). An HTML wrapper is loaded having logic 350 which validates whether system 310 has a proper version (revision) of Flash player (Flex environment) installed (step 4020). If not, the proper version of Flash player is installed (e.g., via automatic download and/or by prompting the user) (step 4070) and execution resumes at step 4020. Next logic 350 validates whether system 310 has a proper version (revision) of JRE (Java environment) installed (step 4020). If so, system 310 completes startup by loading a Java applet having manager 340 and extensions 370A-370C (step 4080), searching for Java and Flex login candidates (storage systems 420A-420C) based on context information 430 (step 4090), and assuming the context information is valid, prompting for login (attempting to communicate via extensions) and displaying a GUI such as GUI 260 (step 4100). Depending on the implementation and particular case, the context information may be or include a list of IP addresses for storage systems and/or the IP address of the storage system having client launch resources 440 including the HTML wrapper corresponding to the URL that was loaded. (For example, if the HTML wrapper is loaded from client launch resources 440 of storage system 420B, logic 350 is at least aware of the IP address for system 420B.) The list of IP addresses may correspond to all storage systems within a domain.

If at step 4030 the system lacks a proper version of JRE, logic 350 avoids loading the Java applet for now (step 4040), which avoids installation of the JRE. Logic 350 determines, for each candidate storage system identified in context information 430 (e.g., by IP address), whether login (communications) is possible using any Flex extension, i.e., whether any Flex extension is found that can handle communications with the candidate storage system (step 4050). If any candidate storage system lacks a Flex extension, the user is prompted that installing the JRE may be necessary in order to communicate with the storage system (because the storage system may be a Java-access system, unless there is an error in the context information) (step 4110). For every candidate storage system having a Flex extension, communication is established (step 4060). If no candidate storage system lacks a Flex extension, it is determined that installing the JRE is not needed because all of the storage systems can be handled using pure Flex, i.e., using only the Flex extensions (step 4120).

Aside from the Java environment, any of different implementation technologies may be used in an embodiment in connection with presenting the GUI to a user. As an example, implementation technologies that may be supported include HTML, a technology such as Nexweb which uses graphics or drawing commands with a rendering engine, AJAX (Asynchronous Javascript And XML), Adobe® Flash™ or Adobe® Flex™, as well as a Windows-based application written in any one or more different programming languages used to render the UI.

Each component described herein may be a means for performing the functions described. Each components described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing software environment installation, the method comprising:
 identifying a set of data storage systems to be managed via a Flex based data storage management application, wherein the set of data storage systems comprises a flex-access system and java-access system;

determining whether the Flex based data storage management application can communicate with every data storage system in the set of data storage systems;

in response to determining that the Flex based data storage management application cannot communicate with the java-access system, determining that the installation of a Java operating environment is required to allow the Flex based data storage management application to communicate with the java-access system;

based on determining that the installation of the Java operating environment is required to allow the Flex based data storage management application to communicate with the java-access system, delaying the installation of the Java operating environment until an operation is performed requiring the installation of the Java operating environment; and in response to installing the Java operating environment, routing communications to the java-access system through the Java operating environment.

2. The method of claim 1 wherein communication between the Flex based data storage management application and the flex-access system relies on a Flex based extension.

3. The method of claim 1 wherein communication between the Flex based data storage management application and the java-access system relies on a Java based extension.

4. The method of claim 1 wherein determining whether the Flex based data storage management application can communicate with every data storage system in the set of data storage systems includes determining whether the Flex Based data storage management application can communicate with every data storage system in the set of data storage systems using a Flex extension.

5. The method of claim 4 wherein installation of a Java operating environment allowing the Flex based data storage management application to communicate with every data storage system in the set of data storage systems is determined to be required for each data storage system lacking a usable Flex based extension.

6. The method of claim 1 further comprising:
notifying a user that installation of a Java operating environment may be required to allow the Flex based data storage management application to communicate with every data storage system in the set of data storage systems.

7. The method of claim 1 wherein installation of a Java operating environment allowing the Flex based data storage management application to communicate with every data storage system in the set of data storage systems is based on a user selection.

8. The method of claim 1 wherein installation of a Java operating environment allowing the Flex based data storage management application to communicate with every data storage system in the set of data storage systems is caused automatically.

9. A system for use in managing software environment installation, the system comprising:
a processor comprising a program logic for carrying out the steps of:
first logic identifying a set of data storage systems to be managed via a Flex based data storage management application, wherein the set of data storage systems comprises a flex-access system and java-access system;

second logic determining whether the Flex based data storage management application can communicate with every data storage system in the set of data storage systems;

in response to determining that the Flex based data storage management application cannot communicate with the java-access system, third logic determining that the installation of a Java operating environment is required to allow the Flex based data storage management application to communicate with the java-access system;

based on determining that the installation of the Java operating environment is required to allow the Flex based data storage management application to communicate with the java-access system, fourth logic delaying the installation of the Java operating environment until an operation is performed requiring the installation of the Java operating environment; and in response to installing the Java operating environment, fifth logic routing communications to the java-access system through the Java operating environment.

10. The system of claim 9 wherein communication between the Flex based data storage management application and the flex-access system relies on a Flex based extension.

11. The system of claim 9 wherein communication between the Flex based data storage management application and the java-access system relies on a Java based extension.

12. The system of claim 9 wherein determining whether the Flex based data storage management application can communicate with every data storage system in the set of data storage systems includes determining whether the Flex Based data storage management application can communicate with every data storage system in the set of data storage systems using a Flex extension.

13. The system of claim 12 wherein installation of a Java operating environment allowing the Flex based data storage management application to communicate with every data storage system in the set of data storage systems is determined to be required for each data storage system lacking a usable Flex based extension.

14. The system of claim 9 further comprising:
sixth logic notifying a user that installation of a Java operating environment may be required to allow the Flex based data storage management application to communicate with every data storage system in the set of data storage systems.

15. The system of claim 9 wherein installation of a Java operating environment allowing the Flex based data storage management application to communicate with every data storage system in the set of data storage systems is based on a user selection.

16. The system of claim 9 wherein installation of a Java operating environment allowing the Flex based data storage management application to communicate with every data storage system in the set of data storage systems is caused automatically.

* * * * *